United States Patent [19]

Nony et al.

[11] Patent Number: 5,637,001

[45] Date of Patent: Jun. 10, 1997

[54] PCMCIA CONNECTION DEVICE

[75] Inventors: Pierre J. O. Nony, Vigny; Frédéric N. Viloteau, Poissy, both of France

[73] Assignee: The Whitaker Corporation, Wilmington, Del.

[21] Appl. No.: 370,135

[22] Filed: Jan. 9, 1995

[30] Foreign Application Priority Data

Jan. 13, 1994 [FR] France ................... 94 00328

[51] Int. Cl.⁶ ................................................ H01R 13/62
[52] U.S. Cl. ...................... 439/131; 439/928.1; 235/482
[58] Field of Search ............................... 439/152–160, 439/64, 131, 310, 259; 235/482, 483, 441

[56] References Cited

U.S. PATENT DOCUMENTS

| | | | |
|---|---|---|---|
| 4,128,288 | 12/1978 | Zachry et al. | 339/45 M |
| 4,529,872 | 7/1985 | Dinges | 235/483 |
| 4,724,310 | 2/1988 | Shimamura et al. | 235/483 |
| 4,794,242 | 12/1988 | Grassi et al. | 235/482 |
| 4,810,200 | 3/1989 | Sakamoto | 439/155 |
| 4,839,509 | 6/1989 | Yasuma et al. | 235/483 |
| 4,887,188 | 12/1989 | Yoshida et al. | 361/413 |
| 4,936,790 | 6/1990 | De La Cruz | 235/482 |
| 4,952,161 | 8/1990 | Komatsu | 439/155 |
| 5,011,420 | 4/1991 | Sakamoto | 439/152 |
| 5,026,296 | 6/1991 | Hashiguchi | 439/159 |
| 5,033,972 | 7/1991 | Komatsu et al. | 439/153 |
| 5,051,101 | 9/1991 | Komatsu | 439/159 |
| 5,139,435 | 8/1992 | Komatsu et al. | 439/159 |
| 5,145,389 | 9/1992 | Okubo | 439/159 |
| 5,146,069 | 9/1992 | Orimoto et al. | 235/475 |
| 5,149,276 | 9/1992 | Dixon | 439/159 |
| 5,152,697 | 10/1992 | Abe et al. | 439/159 |
| 5,161,989 | 11/1992 | Okubo et al. | 439/159 |
| 5,179,505 | 1/1993 | Matsuo | 361/395 |
| 5,197,894 | 3/1993 | Koike | 439/159 |
| 5,234,351 | 8/1993 | Dixon | 439/160 |
| 5,336,877 | 8/1994 | Raab et al. | 235/441 |

FOREIGN PATENT DOCUMENTS

| | | |
|---|---|---|
| 0 230 275 | 7/1987 | European Pat. Off. . |
| 0 232 115 | 8/1987 | European Pat. Off. . |
| 0 349 210 | 1/1990 | European Pat. Off. . |
| 3412453 | 4/1984 | Germany ............ 235/441 |
| 0316289 | 12/1988 | Japan ................. 235/441 |
| 5-233886 | 9/1993 | Japan . |
| 2 054 506 | 2/1981 | United Kingdom . |
| WO91/00681 | 1/1991 | WIPO . |

Primary Examiner—Neil Abrams
Assistant Examiner—Brian J. Biggi

[57] ABSTRACT

A PCMCIA memory card connection device is shown comprising a support frame in which is slidably mounted a chariot driven by an electric motor via a worm gear cooperating in a screw thread of a lateral guide of the chariot. A PCMCIA memory card is insertable into the connection device and connectable to a connector mounted on a transverse bar between lateral guides of the chariot. Full insertion of the card against the connector is detected by a micro switch mounted on the transverse bar of the chariot, whereby the electric motor is then actuated and draws back the chariots to a position where the memory card is well within the computing device and protected from electromagnetic interference by the faraday cage thereof.

16 Claims, 3 Drawing Sheets

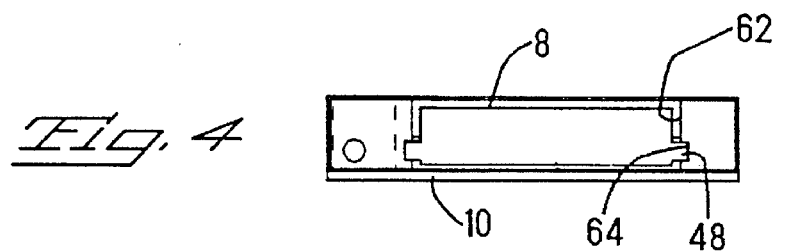
Fig. 4
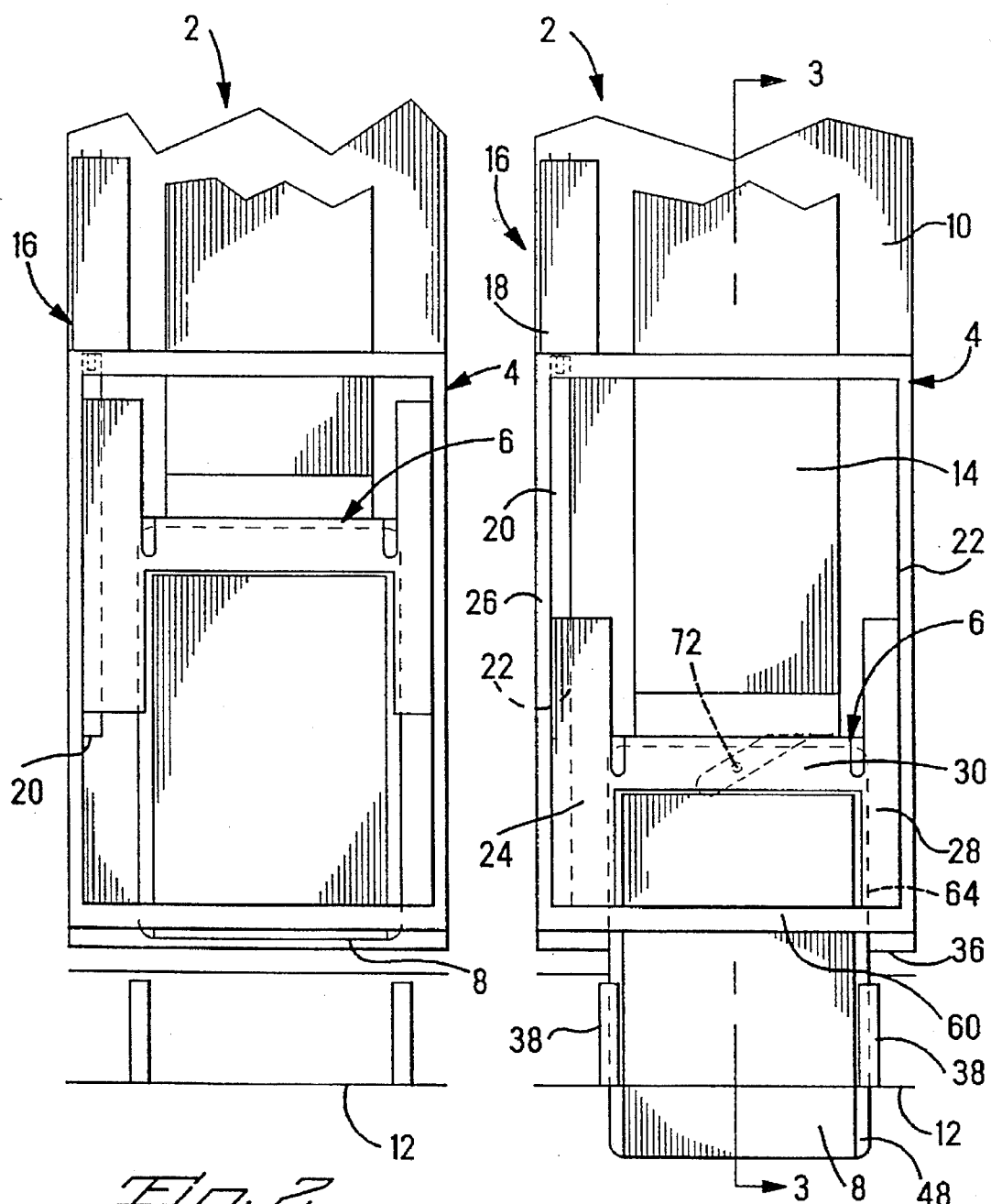
Fig. 2
Fig. 1

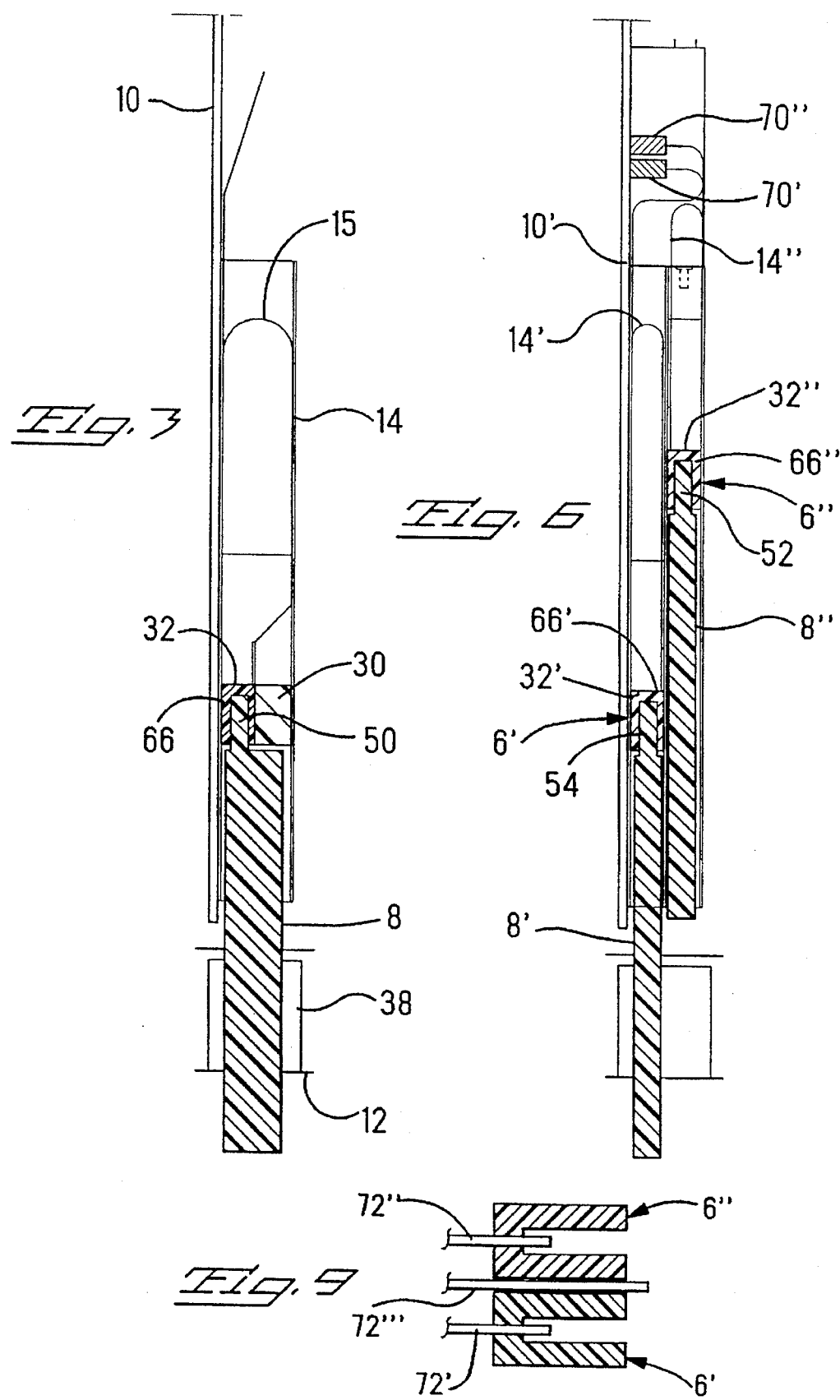

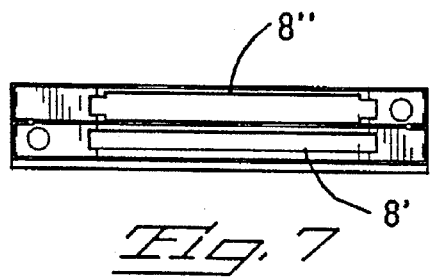
Fig. 7
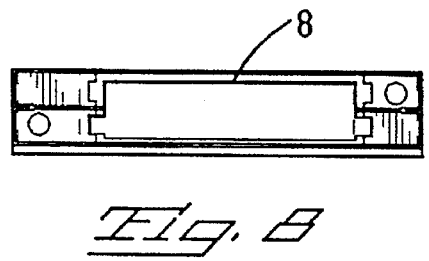
Fig. 8
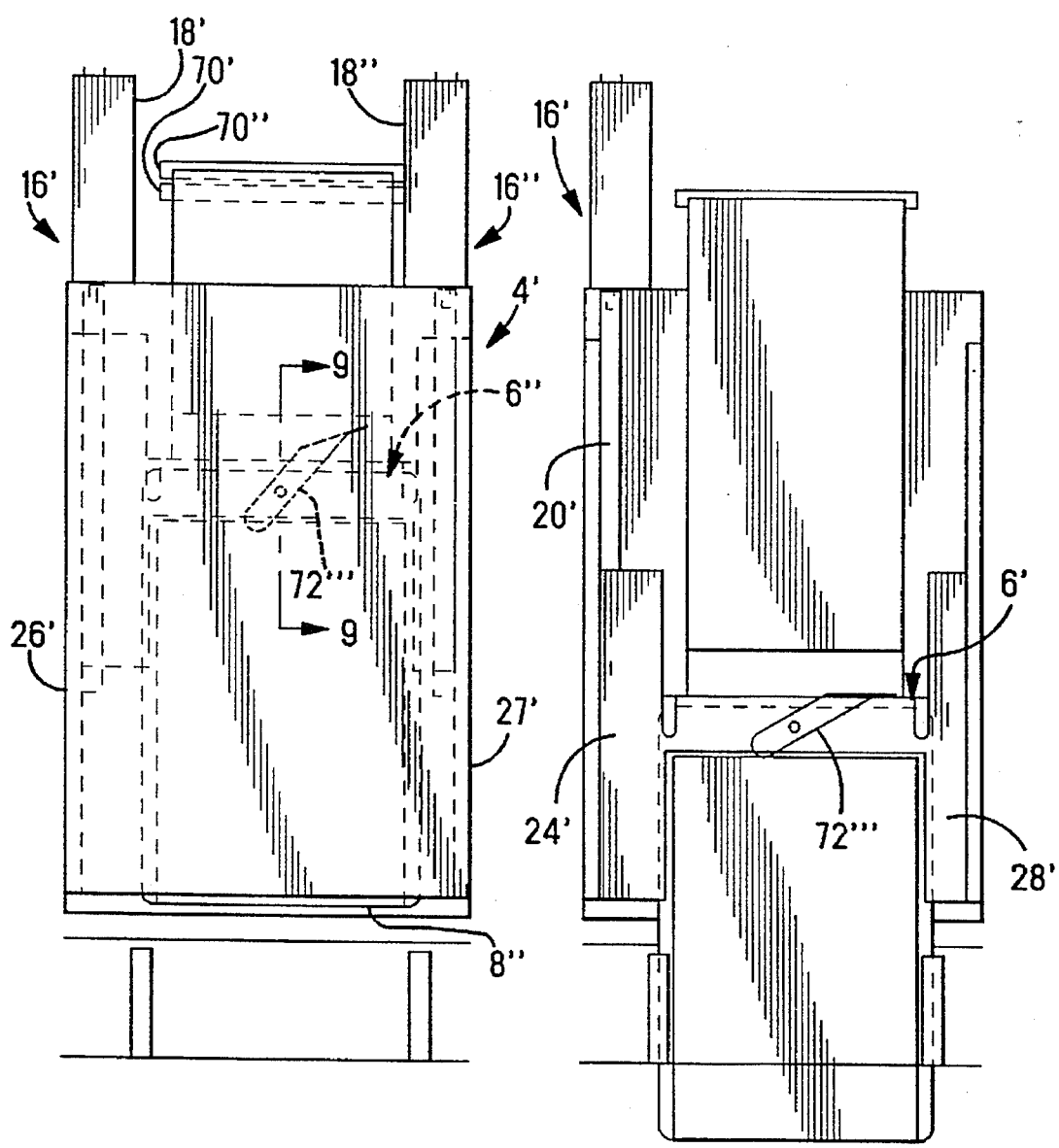
Fig. 5a
Fig. 5b

PCMCIA CONNECTION DEVICE

BACKGROUND OF THE INVENTION

1. Field of the Invention

This invention relates to a connection device for making electrical connection between a memory card and an electronic apparatus such as a computer, the device having a mechanism for drawing the memory card into the apparatus when in use.

2. Description of the Prior Art

Memory cards are electronic components usually comprising a substrate card with electronic chips and circuitry thereon, the memory card being pluggable to a computer and acting as a module for storing programs, providing memory space, releasing the identity of the user, and other such applications. The increasing compactness of electronic components and assembly thereof has led to increasing the number of applications and therefore the use of memory cards. In order to facilitate widespread use of memory cards, certain standards have been developed, for example the PCMCIA (Personal Computer Memory Card International Association) standard that defines, inter alia, the connection interface and external dimensions of the cards. To this date, there are three standard PCMCIA cards, type 1, type 2 and type 3.

Connection of memory cards to computing equipment has been effectuated by loading the card into a spring loaded inserter/ejector mechanism and manually pushing the card into the computing equipment, whereby an end of the card projects out of a face of the computer. Due to the high speed data transmission in the electrical circuitry of the memory card, there is a radiation of electromagnetic noise which could effect other computing equipment in it's proximity. Additionally, electrostatic or electromagnetic disturbances from the exterior of the computer could create undesirable noise for the memory card. In order to overcome this problem, one could load the memory card on a caddy and push the caddy into the machine such that the card is fully enclosed by the exterior walls of the computer which have a conductive layer acting as a faraday cage, the card therefore protected from external electromagnetic and electrostatic interference. There would however be a portion of this caddy projecting out of the computer face, which is not ergonomic and preferably avoided, as the caddy may get damaged, especially when the caddy is in the card receiving position. The known manual inserter/ejectors, must also be manually operated to eject the memory card from the computer. The latter is less desirable than a means electronically controlled by the computer in order to avoid inadvertent extraction of the card whilst it is being used, or to avoid stealing of the card by an unauthorized user, this being much simpler to control electronically.

SUMMARY OF THE INVENTION

It is therefore an object of this invention to provide a connection device for connecting memory cards to an electronic apparatus that draws the card into the apparatus such that it is protected by the faraday cage thereof for eliminating electromagnetic and electrostatic interference therewith.

It is a further object of this invention to provide a connection device for connecting a memory card to an electronic apparatus, whereby the memory card connection device is compact, cost-effective and electronically operable by the apparatus.

The objects of this invention have been achieved by providing a memory card connection device having a memory card support frame and a memory card connector and characterized in that the connection device comprises a first chariot slidably mounted in the support frame and having the connector thereon, the chariot being connected to a first electrical motor mechanism for moving the memory card from the first position projecting out of the electronic apparatus to a second position within the apparatus.

The connection device may also be provided with a second chariot slidably received in the support frame for connection to a plurality of standardized card, e.g. simultaneous connection to PCMCIA type 1 and type 2, or connection to PCMCIA type 3.

BRIEF DESCRIPTION OF THE DRAWINGS

FIG. 1 is a top view of a memory card connection device having a memory card connected thereto in a first position for receiving the card;

FIG. 2 is a top view of the connection device of FIG. 1 but with the card in a fully inserted second position;

FIG. 3 is a cross-sectional view through lines 3—3 of FIG. 1;

FIG. 4 is a front end view of the connection device in the direction of arrow 4 of FIG. 1;

FIG. 5a is a top view of another embodiment receiving two memory cards whereby both memory cards are fully connected thereto;

FIG. 5b is a top view of the embodiment of FIG. 5a showing only one of the two card connection devices (the lower one);

FIG. 6 is a cross-sectional view through lines 6—6 of FIG. 5;

FIG. 7 is a front end view of the embodiment of FIG. 5 with two memory cards (PCMCIA type 1 and 2) simultaneously received therein;

FIG. 8 is a front view of the embodiment of FIG. 5 with a single memory card received therein; and FIG. 9 is a schematic cross-sectional view of microswitches through line 9—9 of FIG. 5a.

DETAILED DESCRIPTION OF THE PREFERRED EMBODIMENT

Referring first to FIGS. 1–4, a single memory card connection device 2 comprises a support frame 4 within which is mounted a slidable chariot 6 for receiving a first memory card 8 within an electronic apparatus having a printed circuit board 10 and an outer electrically conductive shell 12. The memory card connection device 2 is mounted on the printed circuit board 10 and electrically connected thereto via a flat flexible cable 14 folded over in a U-bend 15. The memory card connection device 2 further comprises a motor mechanism 16 for slidably moving the chariot 6 within the support frame 4, the motor mechanism 16 comprising an electrical motor 18 mounted to the support frame 4, and a worm gear 20 engaged in a thread 22 in a lateral guide 24 of the chariot 6. The support frame 4 comprises side walls 26, 27 for laterally guiding the chariot 6 whereby, lateral guides 24 and 28 of the chariot 6 are contiguous the respective side walls 26, 27 of the frame 4. Joining the lateral guides 24, 28, is a transverse bar 30 to which a memory card connector 32 is mounted, the connector 32 having pin terminals therein for connection with receptacle contacts of the card 8, the pin terminals also interconnected to the flat flexible cable 14.

A front edge 36 of the printed circuit board 10 is spaced from the electronic apparatus outer shell 12 and card guides 38 are positioned therebetween on either side of the card 8 for accurate guiding thereof into the connection device 2.

The card 8 as shown in FIGS. 1–4 has electronic circuitry therein and is standardized according to the PCMCIA type 3 standard which defines the connection interface and exterior dimensions of the card 8. The thickness of the type 3 card is approximately 10.5 mm whereby there are other standard PCMCIA cards according to type 1 and type 2 standards which relate to the cards 8' and 8" shown in FIG. 6 which have thicknesses of 3.3 mm and 5 mm respectively, the sum of which is slightly less than the thickness of the type 3 card. As shown in FIGS. 4, 7 and 8, the cards of type 1, 2 and 3 have lateral guide protrusions 44, 46 and 48 respectively which are disposed in the same positions with respect to receptacle connectors 50, 52, 54 respectively thereof. The latter means that if a connector is matable with a type 3 card, it will also be matable with a type 1 or a type 2 card.

Referring back to FIG. 1, the chariot 6 is shown in a forwardmost position whereby the lateral guides 24, 28 abut a front wall 60 of the support frame 4, the front wall 60 having an opening 62 for receiving the card type 3 therethrough between the lateral guides 24, 28 which have lateral grooves 64 therein engageable around the guide protrusion 48 of the card. The chariot 6 and a housing 66 of the connector 32 for receiving the pin terminals therein, can be integrally moulded with the chariot 6 for reducing the number of parts. The latter solution would provide a cost-effective design.

Loading of the memory card 8 to the electronic apparatus will now be described. In the card receiving position, the chariot 6 abuts the front wall 60 of the support frame 4 as shown in FIG. 1. The memory card 8 can then be inserted through the outer wall 12 of the electronic apparatus, laterally guided by the guides 38 that also ensure that the card 8 is correctly orientated by cooperation with the lateral protrusions 48. Manual insertion of the card 8 is continued until the connector 50 of the card is fully mated with the connector 32 of the connection device 2. This requires a considerable force in comparison to inserting and sliding forces of the card 8 which is only opposed by frictional forces of the cooperating guides. Due to the use of the worm gear 20 to drive the chariot 6, the gear acts as a stop member due to the irreversibility hereof, holding the chariot in it's forward position. Once the card 8 is properly connected to the chariot 6, electronic circuitry of the computer detects full insertion due to a micro switch 72 fixed to the transverse bar 30 of the chariot and being engageable against the card.

Indication of full insertion starts the motor 18 which pulls the chariot 6 into a rearmost position proximate a rear wall 61 of the support frame whereby the card 8 is withdrawn well into the electronic apparatus, at a sufficient distance from the external conductive surface 12 to be uninfluenced by the card receiving hole therein and subject to the full effect of the faraday cage for protecting the memory card from external electromagnetic noise. Additionally, as the card 8 is well retracted into the machine, it is much less prone to damage during transport or otherwise. The worm gear 20 has the advantage of reducing the torque of the electrical motor required to draw back the carriage 6, and a very small motor 18 can therefore be used which helps to maintain the design very compact. Initial manual insertion of the card 8 also keeps the motor size very small as a much larger motor would be needed to overcome the mating forces between the card and the connection device 2, whereby some sort of gripping means on the card would also be necessary, which are however not provided for in the PCMCIA standard. Full insertion of the card into the machine by an electrical motor, also means that the motor is actuated to push out the card, whereby this can be electronically controlled to ensure that no inadvertent extraction of the card is effectuated without necessary steps being taken, e.g. closing files or programs related thereto.

The flat flexible cable 14 is bent over in a U-shape extension which allows the cable to roll backwards and forwards about the U-bend 15 during movement of the chariot 6. The cable 14 is relatively rigid in it's plane, thereby not needing lateral guiding other than connection to the connectors at either end.

Referring now to FIGS. 5–8, another embodiment 2' is shown comprising two chariots 6', 6" for connection to, for example, PCMCIA memory cards of type 1 8' and type 2 8" respectively, whereby the chariots 6' and 6" are mountable one above the other and are similar in construction to the chariots 6 of the embodiment of FIGS. 1–4. There are however some differences, in particular to connectors 32', 32" of the chariots 6', 6" which have a lower profile than the embodiment of FIGS. 1–4. Both chariots 6' and 6" are driven by separate motors 18', 18" which are mounted proximate opposing side walls 26', 27' of the support frame 4'. The connection device 2' is likewise mounted on a printed circuit board 10' and connection thereto is made via flat flexible cables 14', 14" interconnecting the memory cards 8', 8" to respective connectors 70', 70" mounted on the printed circuit board 10'. As the chariots 6', 6" are individually controlled by the motors 18', 18" the first and second cards 8', 8" can be individually loaded or extracted from the electronic apparatus as desired. Full insertion of type 1 and type 2 cards 8', 8" is detected by microswitches 72', 72" respectively positioned in the connectors 70', 70". A further microswitch 73'" is positioned on top of the lower chariot 6', between the chariots 6' and 6", for detecting connection of a type 3 card 8.

The PCMCIA type 3 card 8 would also be inserted into this embodiment 2' whereby the guide protrusions 48 of the type 3 card are in the same position as the guide protrusions 44 of the PCMCIA type 1 card 8' in relation to the card receptacle connector portions 50, 50', the type 3 card 8 therefore being connectable to the lower chariot 6'. In this case, the electronic command of the motors 18', 18" would recognize that a type 3 card is inserted, e.g. because both micro switches 72', 72'" of the first chariot 6' would be actuated, thereby commanding the withdrawal of both chariots 6', 6" in order to allow insertion of the type 3 card into the connection device 2'.

Positioning of the motors 18', 18" on substantially the same level does not substantially increase the space requirements of the connection device 2' and is therefore a compact design. The embodiment of FIGS. 6–8 therefore advantageously allows connection of memory cards according to either the type 3 PCMCIA standard or the simultaneously type 1 and type 2 PCMCIA standards.

Advantageously therefore, due to the use of an electrical motor mechanism, the memory cards can be drawn fully into the faraday cage of a computer for protection thereof and in particular for protection against electromagnetic and electrostatic interference from the exterior of the computing device. The long chariot guides provide stable guiding of the sliding chariot within the support frame, whereby a connector is advantageously mounted thereto, providing electrical connection to the memory cards without waiting for full insertion thereof into the connection device. The latter additionally avoids having a large electrical motor to drive the chariot as the contact forces do not have to be overcome thereby, but only the frictional forces of the sliding chariot. The connector housing can also be integrally moulded with the chariot for a compact and cost-effective design. Use of the worm gear to drive the chariot, provides also a stop function to hold the chariot in position due to the irreversibility of the worm gear. The connection device as described hereinabove is therefore compact, has few parts and is cost-effective yet reliable.

We claim:

1. A memory card connection device for receiving a memory card in an electronic apparatus for electrical connection therewith, comprising a memory card support frame and a memory card connector for electrical connection to the memory card, characterized in that the connection device comprises a slidable first chariot slidably mounted in the support frame and having the connector thereon, the chariot being connected to a first electrical motor mechanism for moving the chariot from a first position, where the memory card is insertable into the connector and will project out of the electronic apparatus, to a second position where the memory card in the chariot will be within the apparatus.

2. The connection device of claim 1 characterized in that the slidable chariot comprises lateral guide bars and a transverse bar extending therebetween, the guide bars cooperable with the support frame for guiding of the chariot.

3. The connection device of claim 2 characterized in that the lateral guide bars are parallel to one another and substantially perpendicular to the transverse bar.

4. The connection device of claim 2 characterized in that the connector is mounted on the transverse bar.

5. The connection device of claim 2 characterized in that the lateral guide bars are spaced apart such that they can receive the card therebetween.

6. The connection device of claim 1 characterized in that the electrical motor mechanism comprises a worm gear for sliding of the chariot.

7. The connection device of claim 6 characterized in that the worm gear engages in a complementary thread in one of the lateral guide bars of the chariot.

8. The connection device of claim 1 characterized in that the motor mechanism comprises an electrical motor mounted to the support frame.

9. The connection device of claim 8 characterized in that the motor mechanism is disposed substantially in line with one of the lateral guide bars of the chariot.

10. The connection device of claim 1 characterized in that the chariot is guided by outer side walls of the support frame.

11. The connection device of claim 1 characterized in that the connector is connected to a flat flexible conducting cable bendable into a U-shaped for following the movement of the chariot.

12. The connection device of claim 1 characterized in that the support frame is mountable to a printed circuit board of the electronic apparatus.

13. The connection device of claim 1 characterized in that the chariot is integrally moulded to a housing of the connector.

14. The connection device of claim 1 characterized in that a switch is mounted on the chariot for detecting completion of mating the memory card to memory card connector.

15. The connection device of any one of claims 1–14 characterized in that the connection device comprises a slidable second chariot mounted above the first chariot and functioning in a similar manner thereto for receiving a second memory card.

16. The connection device of claim 15 characterized in that the second chariot is movable by a second electrical motor mechanism similar to the first electrical motor mechanism, the first and second motor mechanisms being mounted proximate respective opposing sides of the support frame.

* * * * *